United States Patent
Yoshikawa et al.

(10) Patent No.: US 9,090,161 B2
(45) Date of Patent: Jul. 28, 2015

(54) STRUCTURE OF VEHICLE OPERATION PEDAL

(75) Inventors: Mitsuharu Yoshikawa, Tokyo (JP); Kazutoshi Hassaki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 13/424,612

(22) Filed: Mar. 20, 2012

(65) Prior Publication Data

US 2012/0247265 A1 Oct. 4, 2012

(30) Foreign Application Priority Data

Mar. 31, 2011 (JP) ................................. 2011-077421

(51) Int. Cl.
*G05G 1/44* (2008.04)
*B60K 26/02* (2006.01)
*B60T 7/06* (2006.01)
*G05G 1/32* (2008.04)
*G05G 1/487* (2008.04)

(52) U.S. Cl.
CPC . *B60K 26/02* (2013.01); *B60T 7/06* (2013.01); *G05G 1/32* (2013.01); *G05G 1/44* (2013.01); *G05G 1/487* (2013.01); *B60K 2026/026* (2013.01); *Y10T 74/20528* (2015.01)

(58) Field of Classification Search
CPC .. B60K 2026/026; B60K 26/02; B60K 23/00; B60T 7/06; G05G 1/506; G05G 1/34; B66F 9/07504; B66F 9/07509; H01H 3/04; H01H 3/20
USPC ......... 74/512–514, 560, 562.5, 563; 477/213, 477/210
See application file for complete search history.

(56) References Cited

U.S. PATENT DOCUMENTS

| | | | |
|---|---|---|---|
| 1,428,843 A * | 9/1922 | Grant et al. ...................... | 74/563 |
| 1,755,002 A * | 4/1930 | Hibbets ............................. | 74/512 |
| 5,558,601 A * | 9/1996 | Naruse ........................... | 477/213 |
| 5,615,749 A | 4/1997 | Kato | |
| 5,992,262 A * | 11/1999 | Braine et al. ............... | 74/473.16 |
| 6,006,626 A | 12/1999 | Notake et al. | |
| 6,327,930 B1 | 12/2001 | Ono et al. | |
| 6,880,665 B2 | 4/2005 | Oprisch | |
| 7,181,991 B2 * | 2/2007 | Naruse ............................. | 74/512 |
| 7,398,708 B2 | 7/2008 | Harashima et al. | |
| 7,497,143 B2 | 3/2009 | Hayashi | |
| 7,690,279 B2 | 4/2010 | Himetani | |
| 8,100,033 B2 | 1/2012 | Hasegawa et al. | |
| 2007/0289403 A1* | 12/2007 | Yoshihara et al. ........... | 74/562.5 |
| 2011/0277584 A1* | 11/2011 | Heitkamp ........................ | 74/513 |
| 2012/0055279 A1* | 3/2012 | Van Saanen ..................... | 74/513 |

FOREIGN PATENT DOCUMENTS

| | | | |
|---|---|---|---|
| EP | 1 512 596 B1 | 12/2001 | |
| GB | 280139 | * 11/1927 | ...................... 74/512 |

(Continued)

OTHER PUBLICATIONS

English Abstract of JP 2001-279720, Atsuo, Oct. 2001.*

*Primary Examiner* — Vinh Luong
(74) *Attorney, Agent, or Firm* — Smith, Gambrell & Russell, LLP

(57) ABSTRACT

There is provided a structure of a vehicle operation pedal. A guide portion is provided to an accelerator pedal so as to rise toward a driver and to extend diagonally upward from the right to the left, thereby guiding a driver's foot, which moves upward along the accelerator pedal from the pedal pad, toward the left side.

20 Claims, 7 Drawing Sheets

(56) References Cited

FOREIGN PATENT DOCUMENTS

| | | | |
|---|---|---|---|
| JP | 10-264859 A | 10/1998 | |
| JP | 2001-001827 A | 1/2001 | |
| JP | 2001-279720 | * 10/2001 | ............ G05G 1/14 |
| JP | 2005-081910 A | 3/2005 | |

* cited by examiner

STRUCTURE OF VEHICLE OPERATION PEDAL

CROSS-REFERENCE TO RELATED APPLICATIONS

The present application claims priority from Japanese Patent Application No. 2011-077421 filed on Mar. 31, 2011, the entire contents of which are hereby incorporated by reference.

BACKGROUND OF THE INVENTION

1. Field of the Invention

The present invention relates to a structure of an operation pedal, such as an accelerator pedal, that is operated by a foot of an operator upon driving a vehicle.

2. Description of the Related Art

As a structure of the vehicle operation pedal of this type, there has been known the one that is provided to extend downward from a wall face located at the front surface of a vehicle compartment, and that is supported at its upper end so as to be swingable in the longitudinal direction (see, for example, Japanese Patent Application Laid-Open No. 2001-1827).

In a vehicle provided with the structure of the vehicle operation pedal, an injury level of a lower leg of a driver is reduced upon a full-lap collision or offset collision in which an impact is applied to the vehicle from front, so that safety of the vehicle is enhanced. In the vehicle, a spacer member is provided between a pedal pad and a floor in a state in which the operation pedal is depressed to the full. With this structure, when an impact is applied to the vehicle from front, the spacer member prevents the foot of the driver from moving in the widthwise direction from the state of depressing the operation pedal.

However, in the vehicle, there may be the case in which the floor might be deformed when an impact is applied to the vehicle from front. When the floor is deformed, the positional relationship between the operation pedal and the spacer member is changed, so that the movement of the driver's foot in the widthwise direction cannot reliably be inhibited.

In the vehicle, the driver's foot moves upward along the rear surface of the operation pedal, when the impact is applied to the vehicle from front. In this case, the driver's foot collides against a pedal support member supporting the operation pedal, which increases the injury level of the lower leg. When a behavior such as the movement of the vehicle in the widthwise direction is caused immediately after the collision, like in the case of the offset collision, the driver's foot is caught by the operation pedal or the pedal support member, and then, force in the twisting direction is applied to the driver's foot. Therefore, the injury level of the lower leg may be increased.

SUMMARY OF THE INVENTION

The present invention aims to provide a structure of a vehicle operation pedal that can reduce an injury level of a lower leg of a driver by controlling a behavior of the driver's foot, when an impact is applied from the front of the vehicle.

In order to attain the foregoing object, an aspect of the present invention provides an operation pedal that is provided to extend downward from a wall face located at a front of a driver's seat in a vehicle compartment, and that is supported at its upper end so as to be swingable in a longitudinal direction, the operation pedal including: a guide portion that is provided rise toward a driver, and is provided so as to extend diagonally upward from one side to the other side in a widthwise direction, thereby guiding a driver's foot, which moves upward along the operation pedal from a pedal pad to which force of the driver's foot is applied, toward the other side in the widthwise direction.

With this structure, when an impact is applied from the front of the vehicle, the driver's foot can be moved in a predetermined direction from the operation pedal. Therefore, this structure can move the driver's foot toward a space having high safety.

According to the present invention, the driver's foot can be moved toward a space having high safety without being caught by the operation pedal or the pedal support member, when an impact is applied from the front of the vehicle. Accordingly, the injury level of the lower leg of the driver can be reduced, whereby the safety of the vehicle can be enhanced.

DETAILED DESCRIPTION OF THE PREFERRED EMBODIMENT

FIGS. 1 to 8 illustrate one embodiment of the present invention.

Figure 1:
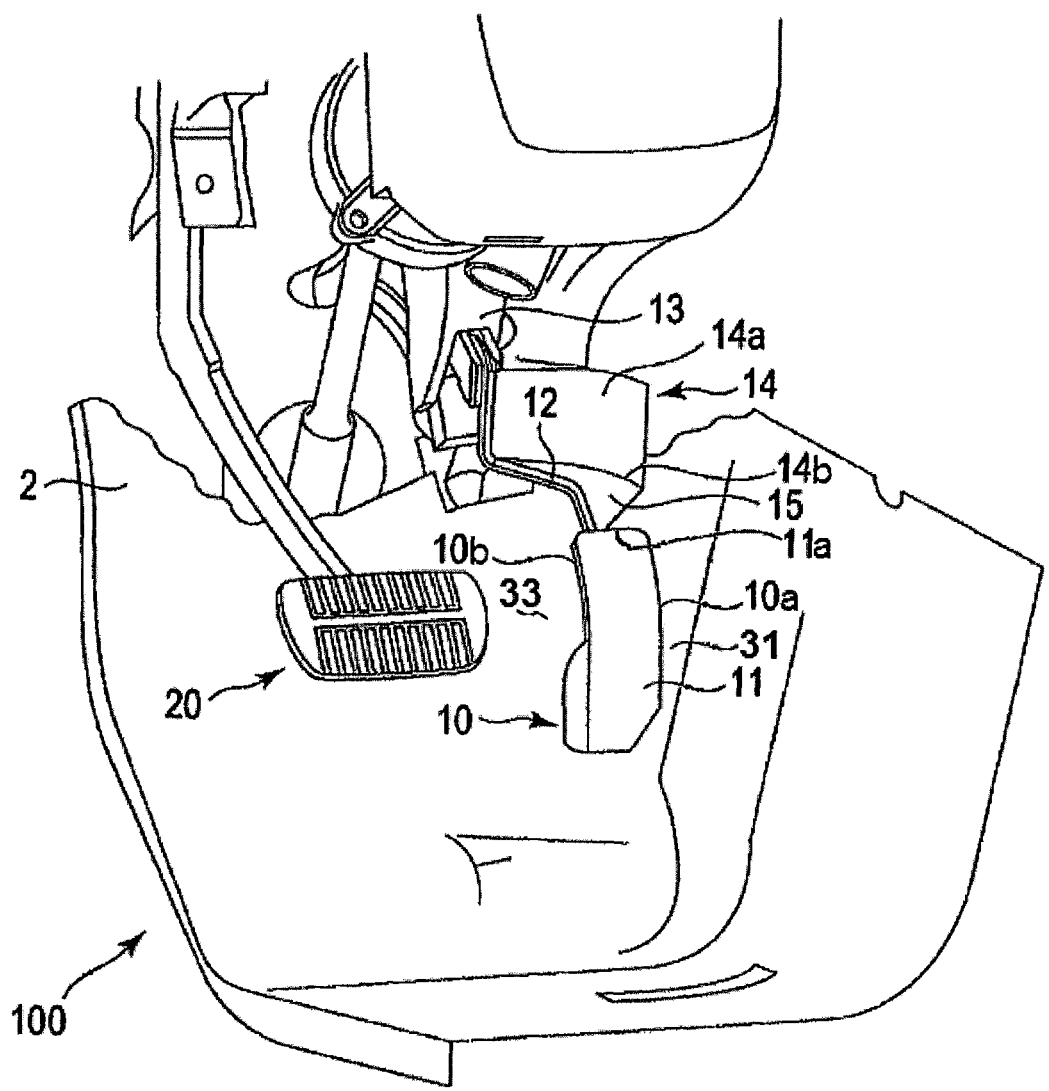
FIG. 1 is a perspective view illustrating a portion that is in front of and below a driver's seat of a vehicle according to one embodiment of the present invention.

A vehicle having a structure of a vehicle operation pedal according to the present embodiment has a driver's seat 1 provided on the left side in a vehicle compartment 100. As illustrated in FIG. 1, an accelerator pedal 10 having the structure of the vehicle operation pedal according to the present embodiment is provided on the right side in a widthwise direction of the vehicle, while a brake pedal 20 is provided on the left side, at a portion in front of and below the driver's seat 1. The vehicle has a space 33 (e.g., a second space) on the left side 10b (e.g., a second side) of the accelerator pedal 10 that is larger than a space 31 (e.g., a first space) on the right side 10a (e.g., a first side) of the accelerator pedal 10 at the portion in front of and below the driver's seat 1. Therefore, the right foot of the driver is moved toward the left, when an impact is applied from the front of the vehicle, like in the case of a full-lap collision or offset collision, whereby an injury level of a lower leg can be reduced.

Figure 2:
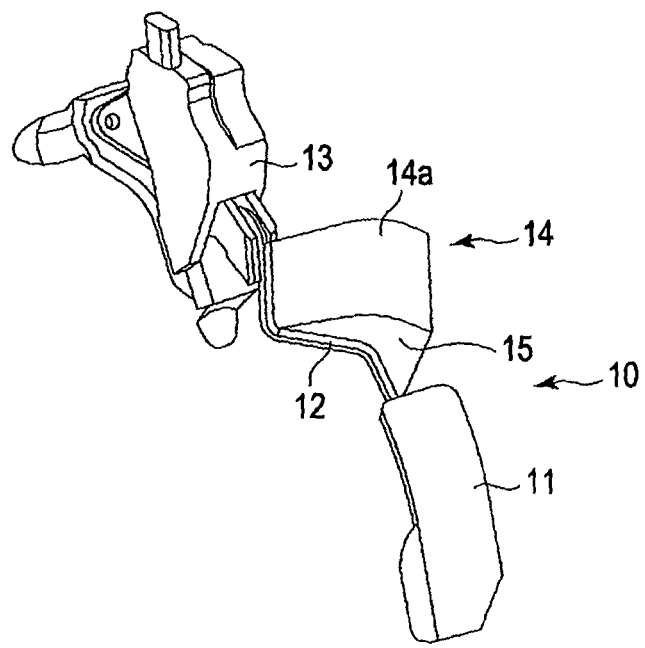
FIG. 2 is a perspective view of an overall of an accelerator pedal and a pedal support member.
Figure 3:
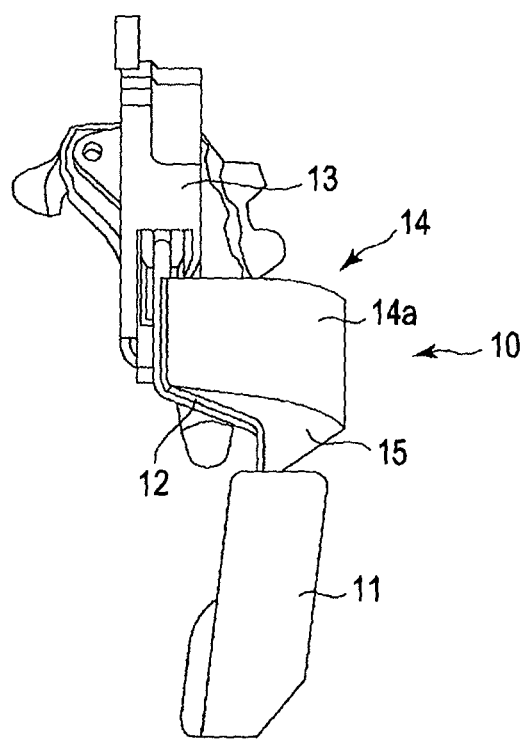
FIG. 3 is a front view illustrating the accelerator pedal and the pedal support member.
Figure 4:
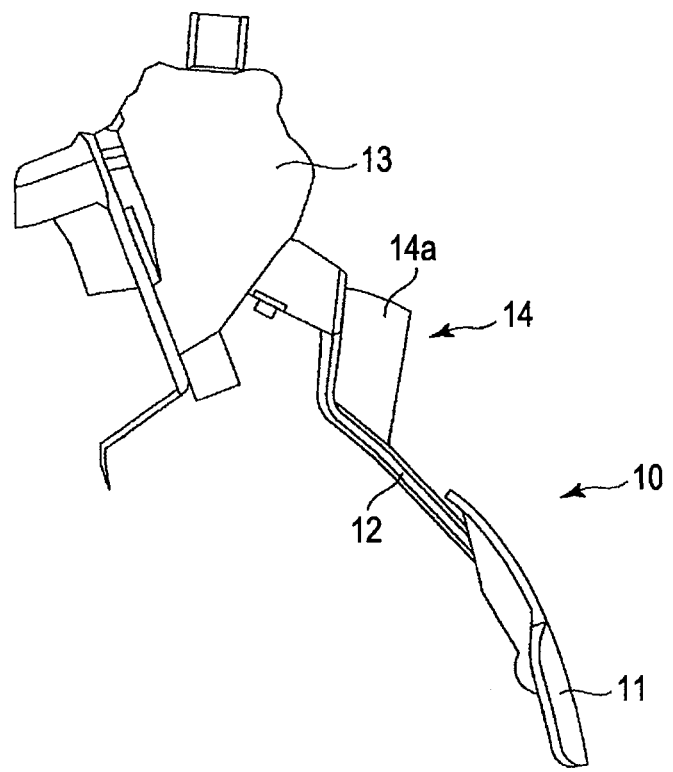
FIG. 4 is a side view illustrating the accelerator pedal and the pedal support member.

The accelerator pedal 10 is provided so as to extend diagonally downward from the front of the driver's seat 1, and it is configured to be swingable in a longitudinal direction about its upper end. As illustrated in FIGS. 2 to 4, the accelerator pedal 10 includes a pedal pad 11 to which force of the driver's foot F is applied, and a pedal arm 12 that supports the pedal pad 11 at its lower end.

The pedal arm 12 is made of an iron member, and it is supported so as to be swingable by a pedal support member 13 whose upper end is provided to a front wall surface 2. A position where the pedal support member 13 can be mounted is limited depending upon a housed state of other devices such as an unillustrated transmission. Therefore, in order to locate the pedal pad 11 at a predetermined position, the pedal arm 12 is curved inward of the vehicle at its upper end, and is curved outward and downward of the vehicle at its lower end to which the pedal pad 11 is mounted.

The pedal arm 12 is provided with a guide portion 14 that guides the driver's foot F, which moves upward along the accelerator pedal 10 when an impact is applied from the front of the vehicle, toward the left side of the vehicle. The pedal arm 12 located between the pedal pad 11 and the guide portion 14 is provided with a sole support portion 15 for supporting a sole of the driver's foot F that moves upward along the accelerator pedal 10. The guide portion 14 and the sole support portion 15 are integrally formed by an iron plate having a thickness of 1 mm or more. The guide portion 14 and the sole support portion 15 are welded to be bonded to the pedal arm 12.

The guide portion 14 is provided to rise toward the driver from the rear surface of the pedal arm 12, and to extend diagonally upward from the right side toward the left side of the vehicle. A guide surface 14a of the guide portion 14, with which a toe of the driver's foot F moving upward along the accelerator pedal 10 is in contact, is formed to have a curved face that is concave toward the pedal pad 11. The guide surface 14a stands at substantially a right angle to the sole of the driver's foot F when it fully depresses the accelerator pedal 10.

The sole support portion 15 is configured to close an area between the pedal arm 12 and a base 14b of the guide portion 14 between the pedal pad 11 and the guide portion 14. The driver's foot F moving upward along the accelerator pedal 10 is guided toward the guide portion 14, since the sole is supported by the sole support portion 15, whereby the toe of the driver's foot is brought into contact with the guide surface 14a.

Behaviors of the right foot F of the driver in the structure of the vehicle operation pedal thus configured when the impact is applied from the front of a running vehicle due to a full-lap collision or offset collision will be described with reference to FIGS. 5 to 8.

Figure 5A:
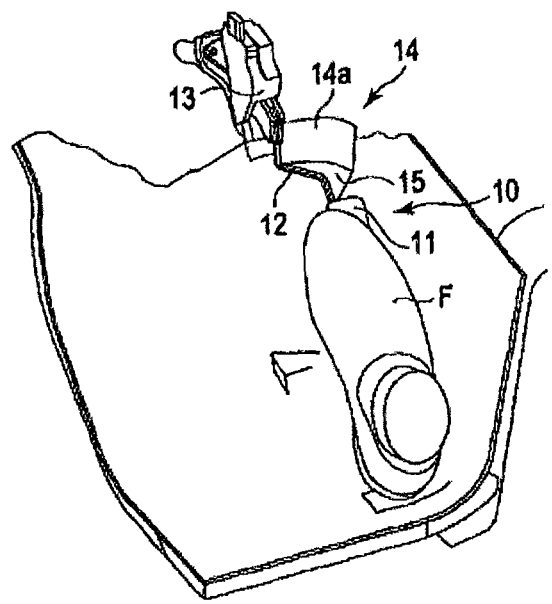
FIG. 5A is a perspective view illustrating a behavior of a driver's foot when an impact is applied from the front of the vehicle.
Figure 5B:
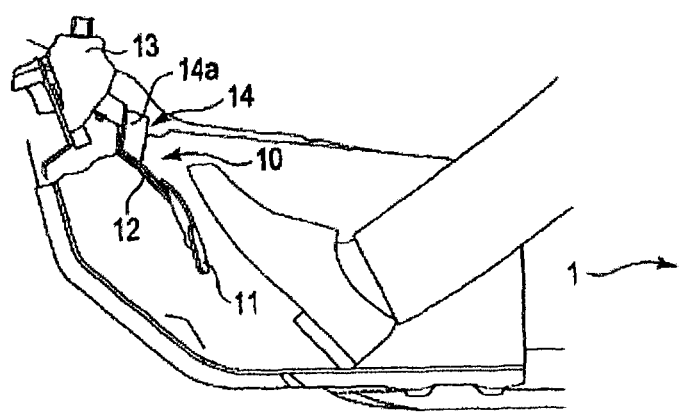
FIG. 5B is a side view illustrating the behavior of the driver's foot when an impact is applied from the front of the vehicle.

When an impact is applied from the front of a running vehicle in the state illustrated in FIG. 5, a driver moves forward due to a rapid deceleration of the vehicle, and the front wall face 2 moves toward the rear side (toward the driver) in a vehicle front-rear direction due to a deformation of the vehicle.

Figure 6A:
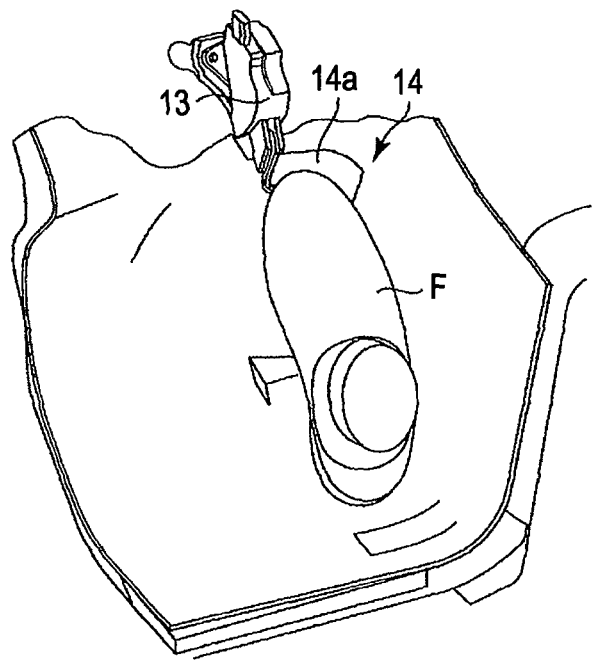
FIG. 6A is a perspective view illustrating a behavior of a driver's foot when an impact is applied from the front of the vehicle.
Figure 6B:
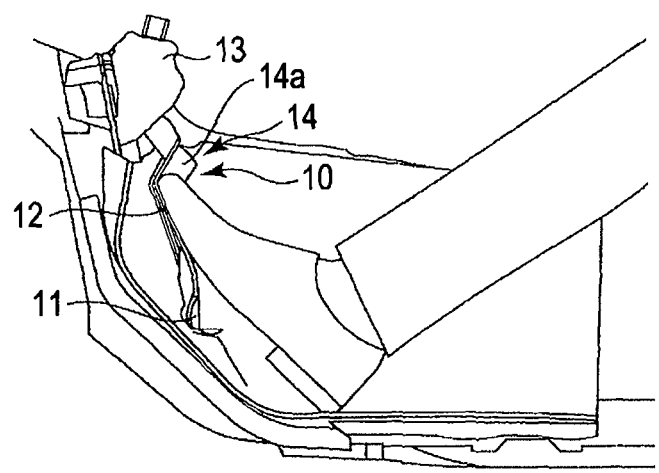
FIG. 6B is a side view illustrating the behavior of the driver's foot when an impact is applied from the front of the vehicle.

The driver's foot F moving forward fully depresses the accelerator pedal 10, and moves upward along the rear surface of the accelerator pedal 10, whereby the toe is brought into contact with the guide surface 14a of the guide portion 14, as illustrated in FIG. 6.

Figure 7A:
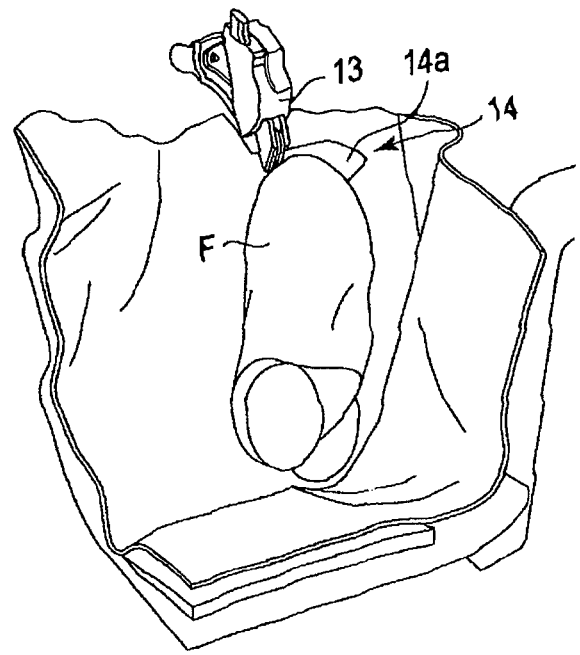
FIG. 7A is a perspective view illustrating a behavior of a driver's foot when an impact is applied from the front of the vehicle.
Figure 7B:
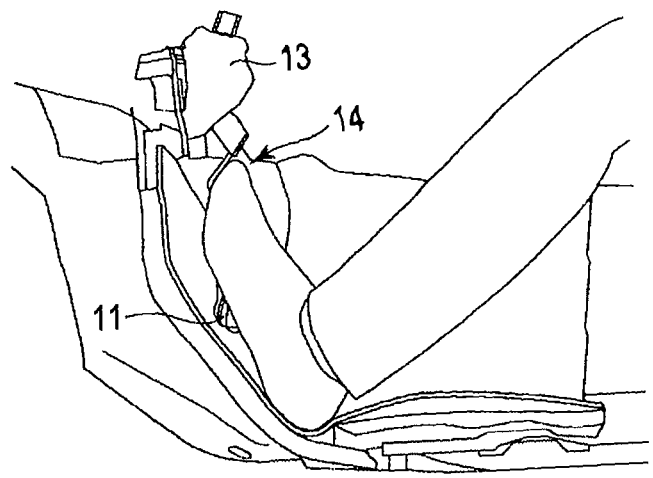
FIG. 7B is a side view illustrating the behavior of the driver's foot when an impact is applied from the front of the vehicle.

The driver's foot F that is brought into contact with the guide surface 14a moves to the left along the guide surface 14a that is formed to have the curved surface and to extend diagonally upward from the right side to the left side of the vehicle, as illustrated in FIG. 7.

Figure 8A:
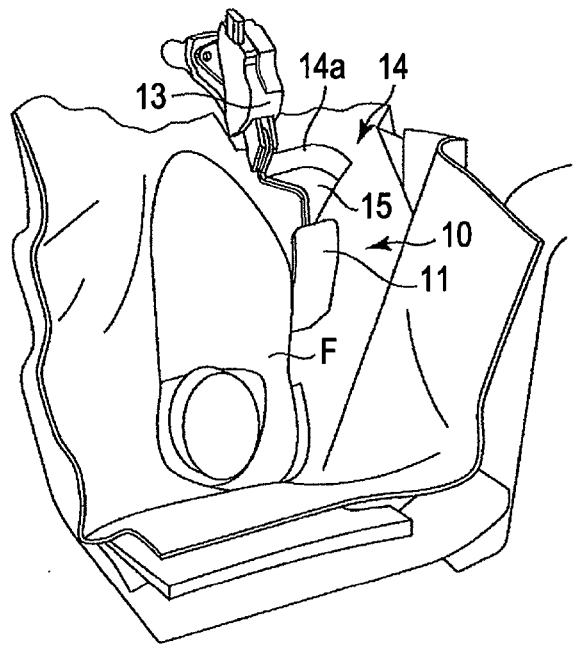
FIG. 8A is a perspective view illustrating a behavior of a driver's foot when an impact is applied from the front of the vehicle.
Figure 8B:
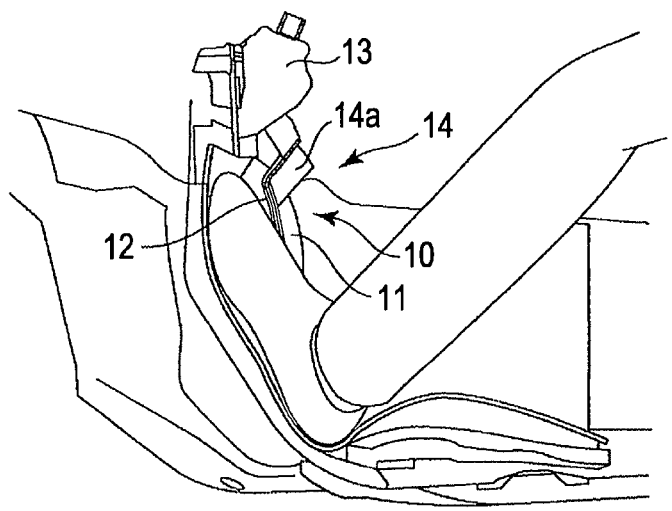
FIG. 8B is a side view illustrating the behavior of the driver's foot when an impact is applied from the front of the vehicle.

The driver's foot F moving to the left along the guide surface 14a is taken off the accelerator pedal 10, moves to the left, and is brought into contact with the front wall face 2 as illustrated in FIG. 8.

In the structure of the vehicle operation pedal according to the present embodiment, the guide portion 14 is provided to the accelerator pedal 10 such that it rises toward the driver and extends diagonally upward from the right side toward the left side, thereby guiding the driver's foot F, moving upward along the accelerator pedal 10 from the pedal pad 11, toward the left side. When an impact is applied from the front of the vehicle, this structure prevents the driver's foot F from being caught by the pedal pad 11 and the pedal arm 12, or the pedal support member 13, those of which constitute the accelerator pedal 10, whereby the driver's foot F can be moved toward the left side having high safety, of the accelerator pedal 10. Accordingly, the force in the twisting direction is not applied to the driver's foot F, with the result that the injury level of the lower leg of the driver is reduced, and the safety of the vehicle can be enhanced.

The guide surface 14a of the guide portion 14 with which the driver's foot is in contact is formed to have the curved shape that is concave toward the pedal pad 11. With this structure, the toe of the driver's foot F moving upward along the accelerator pedal 10 can surely go along the guide surface 14a. Accordingly, the driver's foot F can reliably be moved toward the left where the driver's foot F is taken off the accelerator pedal 10.

The guide portion 14 is provided to the pedal arm 12, and the sole support portion 15 is provided to the pedal arm 12 located between a vertical upper edge 11a of the pedal pad 11 and the base 14b of the guide portion 14. The sole support portion 15 provided along the pedal arm 12 supports the sole of the driver's foot F moving upward along the accelerator pedal 10. With this structure, the toe of the driver's foot F moving upward along the rear surface of the accelerator pedal 10 can be surely brought into contact with the guide surface 14a, resulting in that the safety of the vehicle can more be enhanced.

The guide surface 14a is formed at substantially a right angle to the sole of the driver's foot F when it fully depresses the accelerator pedal 10. With this structure, the toe of the driver's foot F moving upward along the accelerator pedal 10 can surely be moved to the left without being taken off the guide surface 14a after it is brought into contact with the guide surface 14a. Accordingly, the safety of the vehicle can more be enhanced.

In the embodiment, the driver's foot F is moved to the left by the guide portion 14. However, the present invention is not limited thereto. For example, the driver's foot F may be moved to the right in a vehicle that can secure a space to which the foot F can be moved to the right of the accelerator pedal 10 when an impact is applied from front of the vehicle.

In the embodiment, the present invention is applied to the vehicle in which the driver's seat 1 is provided at the left side in the vehicle compartment. However, the present invention is not limited thereto. Even in the case where the present invention is applied to a vehicle having the driver's seat 1 provided at the right side in a vehicle compartment, the foot F may be moved toward either one of the left or right in the widthwise direction where a space to which the foot F can be moved can be secured.

In the embodiment, the present invention is applied to the accelerator pedal 10. However, the present invention is not limited thereto. For example, the effect same as that in the embodiment can be attained, so long as the present invention is applied to an operation pedal operated by the driver's foot F, such as the brake pedal 20 or an unillustrated clutch pedal.

In the embodiment, the guide portion 14 is provided to the pedal arm 12 of the accelerator pedal 10. However, the present invention is not limited thereto. For example, the guide portion 14 may be provided to the pedal pad 11 of the accelerator pedal 10 if the pedal pad 11 has a large size in the vertical direction.

In the embodiment, the guide portion 14 and the sole support portion 15 are made of an iron plate. However, the present invention is not limited thereto. For example, the guide portion 14 and the sole support portion 15 may be made of a synthetic resin material.

In the embodiment, the guide portion 14 and the sole support portion 15 are made of an iron plate, and the guide portion 14 and the sole support portion 15 are welded and bonded to the iron pedal arm 12. However, the present invention is not limited thereto. For example, the guide portion 14 and the sole support portion 15 may be screwed to the pedal arm 12, or the guide portion 14 and the sole support portion 15 may be formed integrally with the pedal arm 12 with a synthetic resin material.

In the embodiment, the guide portion 14 and the sole support portion 15 are integrally formed. However, the guide portion 14 and the sole support portion 15 may be provided independently.

What is claimed is:

1. A vehicle operation pedal located forward of a driver's seat in a vehicle compartment, comprising:
   a pedal arm, a pedal pad supported at a lower end of the pedal arm, a sole support portion and a guide portion, wherein
   the guide portion is positioned forward of the pedal pad in a vehicle front-rear direction, at least when the operation pedal is in a non-depressed state, and oriented to extend toward the driver's seat and diagonally upward in a direction away from a first side of the operation pedal and toward a second side of the operation pedal in a widthwise direction,
   the sole support portion is configured to substantially close an area between the pedal arm and a base of the guide portion between the pedal pad and the guide portion to provide support to a driver's foot that is moving upward along the pedal pad for guiding the driver's foot toward the guide portion,
   a portion of the vehicle compartment in front of and below the driver's seat has a first space adjacent the first side of the operation pedal and a second space adjacent the second side of the operation pedal, with the first space being relatively smaller than the second space and the second space being relatively larger than the first space,
   the sole support portion is aligned with the guide portion such that, during a vehicle collision, the sole support portion supports an upward movement of the driver's foot along the operation pedal to guide the drive's foot toward the guide portion, and the guide portion converts the upward movement of the driver's foot to a lateral movement along the operation pedal, to guide the driver's foot off the operation pedal in a direction toward the relatively larger space of the portion of the vehicle compartment in front of and below the driver's seat.

2. The vehicle operation pedal according to claim 1, wherein
   the guide portion is joined to the pedal arm, and the sole support portion is joined to the pedal arm at a location between the pedal pad and the guide portion.

3. The vehicle operation pedal according to claim 2, wherein
   a guide surface of the guide portion comprises a curved shape that is concave toward the pedal pad and configured for contact by the driver's foot.

4. The vehicle operation pedal according to claim 3, wherein
   the guide surface is configured to extend at substantially a right angle to the pedal pad, at least when the operation pedal is fully depressed.

5. The vehicle operation pedal according to claim 4, wherein
   the guide surface is configured to convert an upward-sliding movement of the driver's foot along the operation pedal to a lateral-sliding movement along the operation pedal.

6. The operation pedal according to claim 1, wherein
   a guide surface of the guide portion comprises a curved shape that is concave toward the pedal pad and configured for contact by the driver's foot.

7. The vehicle operation pedal according to claim 6, wherein
   the guide surface is configured to extend at substantially a right angle to the pedal pad, at least when the operation pedal is fully depressed.

8. The vehicle operation pedal according to claim 7, wherein
   the guide surface is configured to convert an upward-sliding movement of the driver's foot along the operation pedal to a lateral-sliding movement along the operation pedal.

9. The vehicle operation pedal according to claim 1, wherein
   the guide portion is configured to convert an upward-sliding movement of the driver's foot along the operation pedal to a lateral-sliding movement along the operation pedal.

10. A vehicle operation pedal located forward of a driver's seat in a vehicle compartment, comprising:
    a pedal arm, a pedal pad supported at a lower end of the pedal arm, a sole support portion, and a guide portion, wherein
    the guide portion extends vertically above a vertical upper edge of the pedal pad, and is oriented to extend toward the driver's seat and diagonally upward in a direction away from a first side of the operation pedal and toward a second side of the operation pedal in a widthwise direction,
    the sole support portion is configured to substantially close an area between the pedal arm and a base of the guide portion between the pedal pad and the guide portion to provide support to a driver's foot that is moving upward along the pedal pad for guiding the driver's foot toward the guide portion,
    a portion of the vehicle compartment in front of and below the driver's seat has a first space adjacent the first side of the operation pedal and a second space adjacent the second side of the operation pedal, with the first space being relatively smaller than the second space and the second space being relatively larger than the first space, the sole support portion is aligned with the guide portion such that, during a vehicle collision, the sole support portion supports an upward movement of the driver's foot along the operation pedal to guide the drive's foot toward the guide portion, and the guide portion converts the upward movement of the driver's foot to a lateral movement along the operation pedal, to guide the driver's foot off the operation pedal in a direction toward the relatively larger space of the portion of the vehicle compartment in front of and below the driver's seat.

11. The vehicle operation pedal according to claim 10, wherein the guide portion is joined to the pedal arm, and the sole support portion is joined to the pedal arm at a location between the pedal pad and the guide portion.

12. The vehicle operation pedal according to claim 11, wherein a guide surface of the guide portion comprises a curved shape that is concave toward the pedal pad and configured for contact by the driver's foot.

13. The vehicle operation pedal according to claim 12, wherein the guide surface is configured to extend at substantially a right angle to the pedal pad, at least when the operation pedal is fully depressed.

14. The vehicle operation pedal according to claim 13, wherein the guide surface is configured to convert an upward-sliding movement of the driver's foot along the operation pedal to a lateral-sliding movement along the operation pedal.

15. The operation pedal according to claim 10, wherein a guide surface of the guide portion comprises a curved shape that is concave toward the pedal pad and configured for contact by the driver's foot.

16. The vehicle operation pedal according to claim 15, wherein the guide surface is configured to extend at substantially a right angle to the pedal pad, at least when the operation pedal is fully depressed.

17. The vehicle operation pedal according to claim 16, wherein the guide surface is configured to convert an upward-sliding movement of the driver's foot along the operation pedal to a lateral-sliding movement along the operation pedal.

18. The vehicle operation pedal according to claim 10, wherein the guide portion is configured to convert an upward-sliding movement of the driver's foot along the operation pedal to a lateral-sliding movement along the operation pedal.

19. The vehicle operation pedal according to claim 10, wherein a maximum length of the sole support portion in the width direction is greater than a maximum length of the pedal pad in the width direction.

20. The vehicle operation pedal according to claim 10, wherein the sole support portion extends, in a width direction, to both the left and the right of a side of the pedal pad located at the second side of the operation pedal.

* * * * *